United States Patent [19]

Kuzmik

[11] 3,790,400

[45] Feb. 5, 1974

[54] PREPARATION OF PLASTIC SUBSTRATES FOR ELECTROLESS PLATING AND SOLUTIONS THEREFOR

[75] Inventor: John J. Kuzmik, Torrington, Conn.

[73] Assignee: MacDermid Incorporated, Waterbury, Conn.

[22] Filed: July 24, 1972

[21] Appl. No.: 274,177

Related U.S. Application Data

[62] Division of Ser. No. 850,249, Aug. 14, 1969.

[52] U.S. Cl. ............... 117/47 A, 106/1, 117/160 R, 204/30

[51] Int. Cl. ............................................ B44d 5/04

[58] Field of Search ........... 106/1; 117/47 A, 160 R; 204/30; 850/249

[56] References Cited

UNITED STATES PATENTS

| | | | |
|---|---|---|---|
| 3,011,920 | 12/1961 | Shipley | 117/47 A |
| 3,425,946 | 2/1969 | Emons | 106/1 |
| 3,532,518 | 10/1970 | D'Ottavio | 106/1 |

*Primary Examiner*—Lorenzo B. Hayes
*Attorney, Agent, or Firm*—Merrill F. Steward et al.

[57] ABSTRACT

Plastic substrates, such as ABS, are prepared for electroless metal plating by treatment of the surface at a temperature of about 100° to about 175°F. with an activating solution prepared by admixing a glycol ether and an acid stannous chloride-palladium hydrosol. In the hydrosol, catalyst metal particles of colloidal or semicolloidal nature are present.

10 Claims, No Drawings

PREPARATION OF PLASTIC SUBSTRATES FOR ELECTROLESS PLATING AND SOLUTIONS THEREFOR

This is a division of application Ser. No. 850,249, filed Aug. 14, 1969.

This invention relates to a process in which plastic substrates, such as ABS articles, are prepared for electroless plating. More particularly, this invention relates to a process in which such substrates are prepared for electroless metal plating by treatment at a temperature of from about 100° to about 175°F. with a glycol ether activating solution prepared by admixing a glycol ether and an acid stannous chloride-palladium hydrosol.

For chemical plating of substrates, especially in the plating of non-conductive substrates, such as plastics, it has been known for some time that chemically plated metal deposits of suitable thickness and adequate bonding strength are commercially practical only if the substrate surface is properly sensitized and/or activated prior to the chemical deposition. Further, the surface of the plastic substrate must first be cleaned to remove oil, grease or other foreign materials from the surface following which the normally hydrophobic surface of plastics, such as butadiene-acrylonitrile-styrene (ABS), polyethylene, polypropylene, etc., must be treated to render them hydrophilic prior to the sensitization step. Thus, the first step in preparing a plastic substrate for subsequent electroless plating after the usual precleaning operation, generally is to etch the surface with a suitable chemical etchant to prepare its surface for the reception of the sensitizing agent which may be, for example, stannous chloride or another stannous salt. Various proprietary etchant solutions are available for this purpose but one that is preferred consists of approximately 13 percent by weight chromic acid, 40 percent by weight sulfuric acid (66° Be.), the balance being water. This solution is used at approximately 145°F. and the substrate is immersed in or otherwise contacted with it for a period of about 1 to about 10 minutes or more.

The etched substrate is then thoroughly rinsed in water, several times if necessary, and is then immersed in a reducing agent solution to lower excessive hexavalent chromium concentration on the surface after which it is again rinsed in cold water. In the next step, the substrate is immersed in a sensitizing solution which, preferably, is an aqueous solution of stannous chloride. The substrate surface to be plated is then contacted with a solution of the catalytic or activating metal in ionic condition and the metal is reduced in situ on the treated substrate surface. This procedure is employed successfully in many plating-on-plastic applications. It is subject to a disadvantage that, in general, it requires re-racking the articles being plated to avoid contamination through drag-in from proceeding steps and rapid deterioration of the plating bath. An alternative activating method is also known which largely avoids this difficulty and which affords the added advantage of reducing the number of steps from a two-step to a single-step process of activating. In this method, the substrate surface is contacted directly with the solution in which the catalyst metal is already in reduced, metallic state in the form of fine colloidal or at least semi-colloidal particles.

A number of other processes have been described in the art for converting the normally hydrophobic surfaces of plastic substrates to hydrophilic surfaces which are receptive to the sensitizing and/or the activating solutions. For example, in U.S. Pat. No. 3,317,330 substrates, such as polyethylene or polypropylene, are immersed for a few seconds in a bath consisting of concentrated sulfuric acid, water, potassium permanganate, chromic acid and a fluorochemical surfactant wetting agent. It has been found that plastic substrates, thus treated, are receptive to the sensitizing solution and after activation with a solution of a metallic ion, such as palladium chloride, they can be plated by the electroless method.

A complete commercial plating operation, as practiced in the art, is a complex process involving a multiplicity of separate operational steps. A typical operation of this type in which the electroless plating step is followed by an electrolytic plating step includes, after any pre-cleaning of the plastic substrate which may be required, the following steps:

1. Etching the substrate surface with a suitable chromic-sulfuric acid etchant at 150°F. for 5 minutes.

2. Rinsing with cold water.

3. Immersing the plastic substrate in a reducing agent solution to lower excessive hexavalent chromium concentration on the surface of the plastic.

4. Rinsing with cold water.

5. Treating the surface by contacting it with an aqueous solution of stannous chloride or another stannous salt.

6. Rinsing with cold water.

7. Immersing the substrate in an acid stannous chloride-metal hydrosol in which the metal, such as palladium, catalyzes the deposition of the desired metal coating.

8. Rinsing in cold water.

9. Contacting the plastic substrate with an accelerator solution, such as a dilute solution of palladium chloride and hydrochloric acid.

10. Rinsing in cold water.

11. Electroless plating by immersing the plastic substrate in a solution containing copper, nickel or cobalt ions and a reducing agent.

12. Rinsing in cold water.

13. Electroplating the electroless plated metal surface to form a deposit of a plated nickel, copper or cobalt of suitable thickness.

Numerous attempts have been made in the art to provide processes which combine two or more of the above-mentioned pre-cleaning, etching, reduction of hexavalent chromium concentration, sensitizing, and activating steps commonly employed in preparing a plastic substrate for electroless metal plating. For example, in U.S. Pat. No. 3,425,946 a process is described in which the pre-cleaning, etching and sensitizing steps are combined. In this process a solution of a stannous compound, such as stannous chloride in a glycol ether is employed to treat plastic substrates at room temperature. The substrate which may be ABS, is generally contacted with the stannous chloride-glycol ether solution in hydrochloric acid for about 5 minutes at room temperature following which it is rinsed with water to remove the excess of the solution from the surface. During the rinsing step, the pH rises and the stannous chloride breaks down to stannous hydroxide or oxide. Activation of the surface is accomplished in a separate step by applying to the substrate a 1 percent solution of palladium chloride. After the excess palladium chloride solution is thoroughly rinsed off, there is applied to the clean, wet surface a solution of a copper salt, such as copper sulfate, containing sodium hydroxide, Rochelle salts and formaldehyde, thus forming a copper deposit.

All of the processes described in the art for combining or eliminating the usual steps in preparing a plastic substrate for electroless metal plating suffer from one or more disadvantages. In none of the processes, other than those perhaps which combine the sensitization and activation steps, is the bond between the plastic surface and metal film formed during the electroless plating and final electrolytic plating step of satisfactory peel strength. Because of the number of steps in the presently employed processes for preparing plastic substrates for electroless metal plating, considerable equipment is required and attendant labor costs are high.

The chromic acid-sulfuric acid etching step, which is utilized in practically every commercial electroless plating process today, is especially troublesome and expensive. Among the many disadvantages of the use of a chromic-sulfuric etchant to prepare plastic substrates for reception of the sensitizer and/or activator prior to electroless deposition of copper, nickel, or cobalt, the following may be mentioned:

1. The efficiency of the chromic acid-sulfuric acid etching solution drops off radiply necessitating frequent replacement of the expensive etching solution.

2. The present practice of discarding the spent chromic-sulfuric acid bath and concurrent waste disposal problems are particularly expensive and time consuming.

3. The frequent handling of large quantities of the hot, highly corrosive and poisonous etching solutions and the filling and discharging of etchant tanks in a manufacturing process is hazardous to personnel since contact with the skin may result in severe burns.

4. Cleaning of the etched parts to prevent carryover and subsequent poisoning of additional plating steps can create problems on the production line.

5. Because of the high temperature employed (150°F) and strong oxidizing power of the chromic-sulfuric acid solutions, the surfaces of the plastic articles which have been treated with the chromic acid-sulfuric acid etch are sometimes degraded and roughened.

It is a primary object of this invention to provide the art with a convenient, inexpensive one-step process for preparing plastic substrates for the deposition of a metal, such as copper, nickel, or cobalt in an electroless plating process thereby eliminating the necessity of employing the multistep processes of the art.

Another important object of this invention is to eliminate the use of the hazardous and corrosive chromic-sulfuric acid etching operation.

Another object of this invention is to reduce the number of operating steps in preparing plastic substrates for electroless deposition of metals.

Another object of this invention is to reduce the investment required in equipment and to also reduce the labor cost involved in preparing plastic substrate for electroless plating as well as in complete plating processes involving electroless plating followed by electrolytic plating.

Another important object of this invention is to provide a highly efficient plating process in which the metal coating deposited on the plastic substrate treated with the glycol ether activating solution exhibits a high peel strength.

The process of this invention, by which a plastic substrate is prepared for the deposition of a metal by electroless or chemical plating methods, comprises:

A. contacting the plastic substrate at a temperature of about 100° to about 175°F. and for about 1 to about 30 minutes or more with a solution prepared by admixing:

a. glycol ether of the formula:

$$RO\,(R'O)_nH,$$

where R is alkyl of from 1 to 6 inclusive carbon atoms, R' is alkylene of from 2 to 3 inclusive carbon atoms, and $n$ is an integer of from 1 to 3 inclusive, b. an alcohol of the formula:

$$ROH,$$

wherein R has the same meaning as previously described, and c. an acid stannous chloride-palladium hydrosol wherein the metal particles are of substantially uniform spherical shape and size, consisting essentially, in addition to water, of palladium in amount equivalent to about 0.5 to about 5.0 grams per liter of palladium chloride, stannous ion equivalent to about 2.50 to 250 grams per liter of stannous chloride, from about 0.35 to 35.0 grams per liter of sodium stannate, and concentrated (37 percent) hydrochloric acid in an amount equal to about 58 percent by weight of the hydrosol; the said solution comprising about 5 to about 70 percent by weight of the glycol ether, about 0 to about 75 percent by weight of the alcohol, and about 5 to about 50 percent by weight of the acid stannous chloride-palladium hydrosol, and b. rinsing the treated substrate at a temperature of about 90° to about 150°F. to remove the excess of the said solution from the plastic substrate.

Optionally, in addition to the ingredients listed above the solution may contain for the purpose of stabilization of the acid stannous chloride-palladium hydrosol, up to about 10 percent by weight of hydrochloric acid (37 percent by weight) and up to about 10 percent by weight of stannous chloride.

The present invention provides a highly efficient simplified process for preparing plastic substrates for the deposition of metals by the electroless method. Many of the difficulties and disadvantages of the complex prior art processes are eliminated in practicing the process of this invention. Metal coatings deposited on plastic substrates treated according to the novel process exhibit excellent peel strength values.

During the treatment of the plastic substrate with the novel glycol ether activating solution the surface swells, becomes hydrophilic and the activating metal (for example, palladium) present in reduced metallic state in the form of fine colloidal or semi-colloidal particles is carried into the exposed surface pores. On washing or rinsing in water at a temperature of from about 90°F. to about 150°F., the excess glycol activating ether solution is removed, reducing the swelling and, as a result the activating metal is firmly bonded to the plastic.

As described in U.S. Pat. No. 3,532,518 for Colloidal Metal Activating Solutions For Use In Chemically Plating Non-conductors and Process of Preparing Such Solutions, the activator metal sols are prepared by utilizing certain operating steps performed in a particular order and under prescribed conditions. Generally, the preparation of the palladium sols comprises first dissolving an appropriate amount of suitable palladium salt, such as palladium chloride, in acid solution so that all of the palladium goes into solution. To this is then added a reducing agent, such as stannous chloride; but it is an important feature of the preparation of these hydrosols that only an equivalent amount of reducer be added, that is just enough to reduce the palladium from $Pd^{+2}$ to $Pd^0$. After the reducer is added to the palladium chloride solution, the admixture is thoroughly mixed for a period of time which is closely controlled and which has significant effect upon the final particle size, size distribution and shape in the resulting sol. Upon completion of this second step, a suitable protective colloid former is mixed with the balance of the acid needed to give a suitably stable, low pH system and this is then admixed with the first solution. When these solutions are thoroughly mixed, the resultant activator sol is immediately ready for use in the preparing the glycol ether activator solutions of this invention. Stannous chloride is a preferred reducing agent in this preparation since it may also serve, when an excess is added, as the protective, colloid former. It is important however that the excess beyond that needed for reducing the palladium not be added until reduction has been completed and colloidal particles of desired form have been obtained.

A typical palladium chloride activator hydrosol can be prepared as set forth below:

Two grams of palladium chloride (60% Pd) is dissolved in 200 mls. of concentrated (37 percent) hydrochloric acid and 400 mls. of deionized water. The solution is stirred until the palladium chloride is completely dissolved which normally is effected in about 10–15 minutes. The step is carried out at ambient room temperature, as are all others to follow in this example.

To this palladium chloride solution there is then added 4.0 grams of anhydrous stannous chloride. The resulting mixture is stirred for 12 minutes, during which time the color of the solution changes from initial dark green to dark olive brown.

A separate solution is prepared containing 96 grams of anhydrous stannous chloride, 14 grams of sodium stannate ($3H_2O$) and 400 mls. of concentrated hydrochloric acid. The previously prepared palladium-stannous chloride mixture is poured into this second solution with stirring to effect complete admixture. This final solution is a concentrated solution containing about 58 percent by weight concentrated (37 percent) hydrochloric acid, 32 percent by weight water, the balance being the palladium and tin salts, and is ready for immediate use upon suitable dilution as hereinafter described. The activating properites of this concentrate can be made still more aggressive by heating it to 120° to 150°F. for about 3 hours. The solution is highly acid, having a pH substantially below 1.0. It is very stable so that it may be stored for long periods without deterioration.

By the process of this invention a wide variety of plastic substrates can be prepared for the deposition of metals by the electroless or chemical plating method including acrylonitrile-butadiene-styrene (ABS), polysulfones, polypropylenes, polystyrenes, epoxys, phenolics, acrylics, and the like.

Although the composition of the glycol ether activating solution of this invention can be varied within wide limits as previously set forth, a preferred composition is set forth below:

| Ingredient | Percent by Weight |
|---|---|
| Glycol ether | about 5 to about 15 |
| Monohydric alcohol | about 40 to about 75 |
| Acid stannous chloride-palladium hydroxol$_a$ | about 15 to about 30 |

$_a$The hydrosol composition was prepared as previously described.

The glycol ether activating solution can be applied to the plastic substrate in a variety of methods such as by dipping or spraying and is continued for a period of time sufficient to produce the desired effect upon the surface. Preferably, the plastic substrate is dipped into a tank holding glycol ether activator composition. Usually, the time of contacting is from about 1 to about 20 minutes or more and, preferably, will be from about 5 to about 15 minutes. In a like manner, depending upon the concentration of the glycol ether activating solution employed as well as the particular plastic being treated, the temperature at which the substrate is contacted with the glycol ether activating solution can be varied over a wide range and generally will be from about 100° to about 175°F. as previously pointed out and, preferably, will be from about 120° to about 150°F. Generally, the water rinse (Step B) to remove excess activating solution will be conducted at a temperature ranging from about 50° to about 100°F. and, preferably will be from about 60° to about 85°F.

Glycol ethers useful in preparing the solutions employed in treating plastic substrates by the process of this invention include compounds of the formula:

$$RO\,(R'O)_nH,$$

wherein R is alkyl of from 1 to 6 inclusive carbon atoms R' is alkylene of from 2 to 3 inclusive carbon atoms and $n$ is an integer of from 1 to 3 inclusive as exemplified by monomethyl ether of ethylene glycol, monoethyl ether of diethelene glycol, monobutyl ether of diethylene glycol, monoisohexyl ether of ethylene glycol, monoisopropyl ether of diethylene glycol, monoamyl ether of propylene glycol, monoisobutyl ether of dipropylene glycol, monohexyl ether of triethylene glycol and monoamyl ether of tripropylene glycol, etc., and mixtures thereof.

Optionally, the glycol ether solution may contain a monohydric alcohol. Alcohols suitable for use in the novel glycol ether solutions of this invention have the formula:

$$ROH,$$

wherein R is alkyl of from 1 to 6 carbon atoms. Examples of useful alcohols include methyl, ethyl, isoporpyl, butyl, isobutyl, amyl, hexyl, and isohexyl alcohols, etc., and mixtures thereof.

Complete Plating Process

In the complete plating process the plastic substrate surface is first immersed in or contacted with the novel glycol ether activating solution of this invention in the manner previously described.

In the next step, the thus-treated substrate is rinsed in water maintained at a temperature of about 90° to about 150°F. After a cold water rinse, the substrate is contacted at a temperature of about 60° to about 85°F. and for a period of time ranging from about 0.1 to about 5 minutes, with a neutralizer solution which can be about 1 to about 20 percent and, preferably, about 5 to about 12 percent by volume solution of sodium hydroxide, potassium hydroxide or ammonium hydroxide. The neutralizer serves to help anchor the colloidal palladium particles to the plastic substrate. The substrate is again thoroughly rinsed and, in the next step, which is optional, it is contacted at a temperature of about 100° to about 150°F. and, preferably, at about 105° to about 135°F. for a period of time of about 0.5 to about 5 minutes with an aqueous accelerating solution which may be a dilute solution of palladium chloride containing, for example, about 0.087 gms./l. of palladium chloride and sufficient hydrochloric acid to lower the pH of the solution to about 0.5. Following this treatment the substrate is again thoroughly rinsed with cold water and is then ready for chemical plating. Any of a number of conventional copper or nickel electroless plating compositions can be used in this step. In the case of a nickel plate, a suitable plating solution is described in U.S. Pat. No. 2,532,283, Example III, Table II. Similarly a highly suitable copper plating solution is disclosed in U.S. Pat. No. 3,095,309, Example II. This step is followed by electroplating in a conventional manner with copper, nickel or any other desired metal.

The following examples illustrate various embodiments of this invention and are to be considered not limitative:

EXAMPLE I

A glycol ether activating solution of this invention having the following composition was prepared:

| Ingredient | Amount |
|---|---|
| Monobutyl ether of ethylene glycol | 50 mls. |
| Isopropanol | 350 mls. |
| Acid stannous chloride-palladium hydrosol[a] | 100 mls. |
| $SnCl_2$ | 25 gms. |
| HCl (37 percent by weight) | 25 gms. |

[a]The hydrosol composition was prepared as previously described.

An ABS plastic article was immersed in the above-mentioned glycol ether activating composition at a temperature of 135°F. for 7 minutes. The thus-treated article, after being rinsed in cold water, was then immersed for a period of about 1 minute in a solution of 10 percent by volume of ammonium hydroxide maintained at 72°F. The plastic article was then again subjected to a cold water rinse and afterwards immersed for about 2 minutes in an aqueous accelerating solution at 120°F. containing approximately 0.087 grams per liter of palladium chloride and sufficient hydrochloric acid to lower the pH of the solution to about 0.5. After a cold water rinse, the ABS article was immersed in a standard commercial electroless nickel plating bath containing nickel chloride, sodium citrate, sodium phosphite and sufficient ammonium hydroxide to give a pH of 9, for about 5 minutes at a bath temperature of 85°-90°F. The specimen was then subjected to an additional cold water rinse and electroplated in a commercial nickel plating bath using conventional procedures.

In a final step, the plated article was heated at a temperature of about 180°F. for 15 minutes. The plated ABS article, exhibited a smooth, bright nickel coating which was completely continuous in coverage of the substrate including such difficulty platable areas as the gating points in the mold or where the surface configuration of the substrate produces deep crevices or relatively inaccessible pockets. The minimum peel strength of the plate was measured and found to be 3–5 lbs. per inch. Without the heating or baking step, the minimum peel strength of a nickel plate formed in the same way on an identical ABS article was about 1–3 pounds per inch.

Copper plating of the substrate in place of nickel can be effected with equal ease and with equally good results simply by substituting a commercial electroless copper plating solution for the nickel in the electroless plating step of the foregoing cycle. All other steps being unchanged. There is disclosed in U.S. Pat. No. 3,095,309 a typical copper plating solution which may be employed. The system is also effective for electroless plating of cobalt, using any of the commercially available electroless plating solutions.

EXAMPLE II

The glycol ether activating composition of Example I was utilized in a plating cycle in the same manner as in Example I to first electrolessly plate nickel on an ABS substrate followed by a nickel electroplate. The neutralizer employed in this example, however, was a 10 percent by volume solution of sodium hydroxide rather than ammonium hydroxide.

The resulting plated surface was smooth, bright and completely continuous in coverage of the substrate. The minimum peel or bond strength of the plate was measured and found to be 6–8 pounds per inch after the baking cycle had been completed and, without the baking or heating cycle, the minimum peel strength, was 1–2 pounds per inch.

EXAMPLE III

The activating solution set forth in Example I was employed to nickel plate an ABS article in the same plating cycle and in the same manner of Example I with the exception that the ammonium hydroxide solution in the neutralization step was replaced with a potassium hydroxide solution of the same concentration.

ABS articles plated in the above mentioned manner exhibited a nickel deposit which was smooth and bright and completely continuous in coverage of the entire substrate. The minimum peel strength of an ABS article not subjected to the final baking treatment was measured and found to be 1–2 pounds per inch whereas with the baking cycle, the minimum peel strength was 7–10 pounds per inch.

EXAMPLE IV

The following activator solution was prepared:

| Ingredients | |
|---|---|
| Monobutyl ether of ethylene glycol | 400 mls. |
| Acid stannous chloride-palladium hydrosol[a] | 100 mls. |
| $SnCl_2$ | 25 gms. |

-Continued

| Ingredients | |
|---|---|
| HCl (37 percent by weight) | 25 gms. |

ₐThe hydrosol composition was prepared as previously described.

An ABS plastic article was nickel plated using the same plating cycle set forth in Example I with the exception that the neutralization step employing the ammonium hydroxide was omitted. After the ABS substrate has been electrolessly as well as electrolytically plated with nickel it was subjected to the usual baking cycle employed in Example I. The minimum peel strength of the nickel plate of the article which had been heated at 180° for about 15 minutes was 3–5 pounds per inch whereas a similar ABS article plated in the same manner but not subjected to the baking cycle exhibited a minimum peel or bond strength of 1–2 pounds per inch.

EXAMPLE V

The following glycol ether activating solution was prepared:

| Ingredient | Amount |
|---|---|
| Monobutyl ether of ethylene glycol | 300 mls. |
| Monohexyl ether of ethylene glycol | 100 mls. |
| Acid stannous chloride-palladium hydrosolₐ | 100 mls. |
| $SnCl_2$ | 25 gms. |
| HCl (37 percent by weight) | 25 gms. |

ₐThe hydrosol composition was prepared as previously described.

The above-described composition was utilized in a plating cycle in the same manner as in Example I to first electrolessly plate nickel on an ABS substrate followed by a nickel electroplate with the exception that the substrate was immersed in the glycol ether activating solution at a temperature of 125°F. for 7 minutes.

A smooth, bright plated surface which was continuous in coverage, was obtained. After the baking cycle, the minimum peel strength was found to be 3–6 pounds per inch.

EXAMPLE VI

An activating solution having the following composition was prepared:

| Ingredient | Amount |
|---|---|
| Monobutyl ether of ethylene glycol | 200 mls. |
| Isoamyl alcohol | 200 mls. |
| Acid stannous chloride-palladium hydrosolₐ | 100 mls. |
| $SnCl_2$ | 25 gms. |
| HCl (37 percent by weight) | 25 gms. |

ₐThe hydrosol composition was prepared as previously described.

The above-described composition was utilized in a plating cycle in the same manner as in Example I to first electrolessly plate nickel on an ABS substrate followed by nickel electroplate with the exception that the substrate was immersed in the glycol ether activating solution at a temperature of 120°F. for 7 minutes.

The plated surface, which was smooth, bright and continuous in coverage, exhibited a minimum peel strength before baking of about 1 pound per inch and after baking of about 2–8 pounds per inch.

EXAMPLE VII

An activating solution containing the following ingredients in the following amounts was prepared:

| Ingredients | Amount |
|---|---|
| Monobutyl ether of diethylene glycol | 800 mls. |
| Acid stannous chloride-palladium hydrosolₐ | 200 mls. |
| $SnCl_2$ | 50 gms. |
| HCl (37 percent by weight) | 50 gms. |

ₐThe hydrosol composition was prepared as previously described.

Utilizing the plating cycle as set forth in Example I the above-described composition was employed to first electrolessly plate nickel on an ABS substrate followed by a nickel electroplate with the exception that the substrate was immersed in the glycol ether activating solution at a temperature of 125°F. for 6 minutes. The adhesion of the metal plate to the ABS article was measured and found to be, before baking, 2 pounds per inch and 4.5 pounds per inch after baking.

EXAMPLE VIII

A glycol ether activating solution having the following composition was prepared:

| Ingredient | Amount |
|---|---|
| Monoethyl ether of ethylene glycol | 200 mls. |
| Acid stannous chloride-palladium hydrosolₐ | 20 mls. |

ₐThe hydrosol composition was prepared as previously described.

Using this composition an ABS article was nickel plated in the same manner as in Example I with the exception that the substrate was immersed in the glycol ether activating solution at a temperature of 130°F. for 5 minutes. The resulting nickel plated surface was smooth, bright and the coverage was complete.

To demonstrate the advantage of the novel solutions of this invention over glycol ether-stannous chloride solution of the prior art the following experiments were performed:

A. An ABS part was immersed in a solution comprising 990 grams of the monoethyl ether of ethylene glycol and 10 grams of stannous chloride for 8 minutes at 90°F. The substrate was then rinsed in water and immersed in the following solution for 5 minutes:

| | |
|---|---|
| Water (distilled) | 790 gms. |
| HCl (37 percent by weight) | 20 gms. |
| $PdCl_2$ | 10 gms. |

After the part had been rinsed in water, it was then immersed in a standard electroless copper plating bath with the result that no copper plated out on the thus-treated ABS part.

B. A second experiment was performed utilizing the same glycol ether-stannous chloride solution as well as the same palladium solution as employed in (A). In this experiment, the ABS part was treated by immersion in the glycol ether solution for 10 minutes at 120°F., it was rinsed with water and afterwards treated with the palladium chloride solution overnight. On plating in a standard electroless copper plating under the same conditions as in the previous test (A), a rough, non-adherent, highly blistered copper coating resulted.

What is claimed is:

1. A process of treating a plastic substrate which comprises:

A. contacting the plastic substrate at a temperature of about 100° to about 175°F. and for about 1 to about 30 minutes with a solution prepared by admixing:

a. a glycol ether of the formula:

$$RO\,(R'O)_nH,$$

wherein R is alkyl of from 1 to 6 inclusive carbon atoms, R′ is alkylene of from 2 to 3 inclusive carbon atoms, and $n$ is an integer of from 1 to 3 inclusive, b. an alcohol of the formula:

$$ROH,$$

wherein R has the same meaning as previously described, and c. an acid stannous chloride-palladium hydrosol wherein the metal particles are of substantially uniform spherical shape and size, consisting essentially, in addition to water, of palladium in amount equivalent to about 0.5 to about 5.0 grams per liter of palladium chloride, stannous ion equivalent to about 2.50 to 250 grams per liter of stannous chloride, from about 0.35 to 35.0 grams per liter of sodium stannate, and concentrated (37 percent) hydrochloric acid in an amount equal to about 58 percent by weight of the hydrosol; the said solution comprising about 5 to about 70 percent by weight of the glycol ether, about 0 to about 75 percent by weight of the alcohol, and from about 5 to about 50 percent by weight of the acid stannous chloride-palladium hydrosol, and B. rinsing the treated substrate at a temperature of about 90° to about 150°F. to remove the excess of the said solution from the plastic substrate.

2. The process of claim 1 wherein the said plastic substrate is ABS.

3. The product produced by the process of claim 1.

4. The process of claim 1 wherein the said glycol ether is the monobutyl ether of ethylene glycol.

5. The process of claim 1 wherein the said alcohol is isopropanol.

6. The process of claim 1 wherein the time of contacting is from about 3 to about 12 minutes.

7. The method of claim 1 wherein the said contacting temperature is from about 120° to about 155°F.

8. The method of claim 1 wherein the said contacting temperature is about 135°F.

9. The process of claim 1 wherein the said solution also contains up to about 10 percent by weight of stannous chloride and up to about 10 percent by weight of hydrochloric acid (37 percent by weight).

10. The process of claim 1 wherein the said solution comprises from about 5 to about 15 percent by weight of the glycol ether, abotut 40 to 75 percent by wieght of the monohydric alcohol, and about 15 to about 30 parts by weight of the acid stannous chloride-palladium hydrosol.

* * * * *